March 6, 1951 W. G. ERNST ET AL 2,543,904
AUTOMOBILE JACK
Filed Aug. 30, 1946

INVENTOR.
WINFIELD G. ERNST, AND
ROBERT M. NEWLIN,
BY
ATTORNEYS.

Patented Mar. 6, 1951

2,543,904

UNITED STATES PATENT OFFICE 2,543,904

AUTOMOBILE JACK

Winfield G. Ernst and Robert M. Newlin, York, Pa.; said Ernst assignor to said Newlin Application August 30, 1946, Serial No. 694,080

2 Claims. (Cl. 254—122)

This invention relates to lifting jacks, and more particularly to a jack for use in lifting an automobile to change a tire, or the like.

A main object of the invention is to provide an improved lifting jack of the scissors type, said jack being very simple in structure, easy to use and dependable in operation.

A further object of the invention is to provide an improved jack device for use in lifting the portion of an automobile adjacent a wheel while changing tires and the like, said jack being formed and arranged so that its bearing portion substantially follows the movement of the portion of the vehicle being lifted whereby lateral sliding movement of said bearing portion with respect to the lifted portion will be minimized and safe lifting action will be obtained.

Further objects and advantages of the invention will become apparent from the following description and claims, and from the accompanying drawings, wherein:

Figure 1:
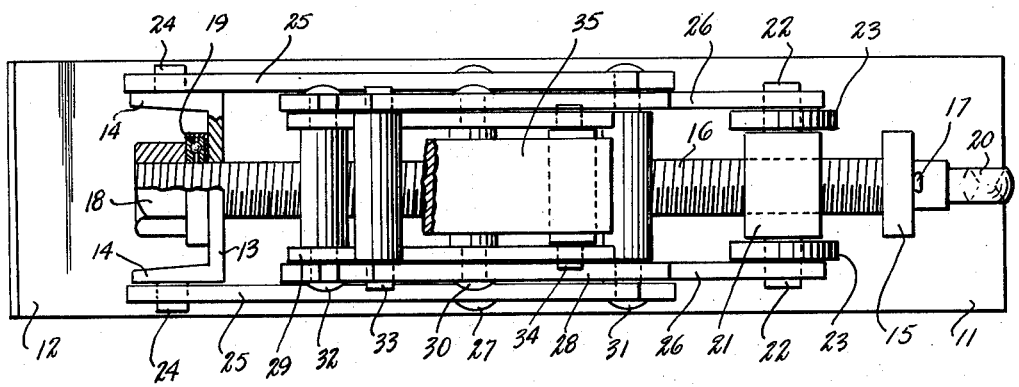
Figure 1 is a top plan view, partly in cross-section, of a lifting jack constructed in accordance with the present invention.

Referring to the drawings, 11 designates a generally rectangular base having an inclined forward end portion 12 to facilitate placing the base in operative position beneath the portion of a vehicle to be lifted, as for example, the frame portion adjacent a wheel. Rigidly secured to base 11 adjacent end portion 12 is an abutment member 13 having side flanges 14, 14. Adjacent its rearward end, base 11 carries an upstanding lug member 15. Rotatably positioned in abutment 13 and lug member 15 is a horizontal threaded shaft 16 extending longitudinally of base 11, said shaft being retained in position by a heavy cotter pin 17 passing through the shaft and bearing on the rear surface of lug member 15 and by a nut 18 threaded on the forward end of the shaft suitably locked thereto, and journaled with respect to abutment member 13 by a thrust bearing 19 positioned between nut 18 and said abutment member. Shaft 16 is formed at its rear end with a head portion 20 adapted to be engaged by a suitable turning implement.

Threaded on shaft 16 intermediate abutment member 13 and lug member 15 is a travelling nut member 21 having laterally projecting side lugs 22, 22. Rotatably mounted on lugs 22, 22 are the respective rollers 23, 23 which bear on base 11 with rolling contact.

Abutment member 13 is formed with laterally projecting side lugs 24, 24 and pivotally secured thereon are the respective bottom or first pair of links 25, 25 of a scissors linkage. A second pair of links 26, 26 are respectively pivotally secured to side lugs 22, 22, the links 25 and 26 on each side of the linkage being arranged in crisscross relation and respectively pinned together at 27. Pivotally secured to the upper ends of the links 25 and 26 at 31 and 32 are a third and fourth pair of links 28 and 29 pinned at 30. The upper ends of links 28, 28 and 29, 29 are provided with the respective connecting pins 33 and 34. The pins 27, 31, 32, 30, 33 and 34 are increased in diameter at their intermediate portions to provide spacing means for the links to rigidify the linkage against side sway.

Overlying the thickened intermediate portions of pins 33 and 34 is a bearing plate 35 having downwardly and inwardly bent hooked ends 36 and 37 cooperating with said thickened portions to retain the bearing plate in position with respect to the subadjacent linkage.

Figure 2:
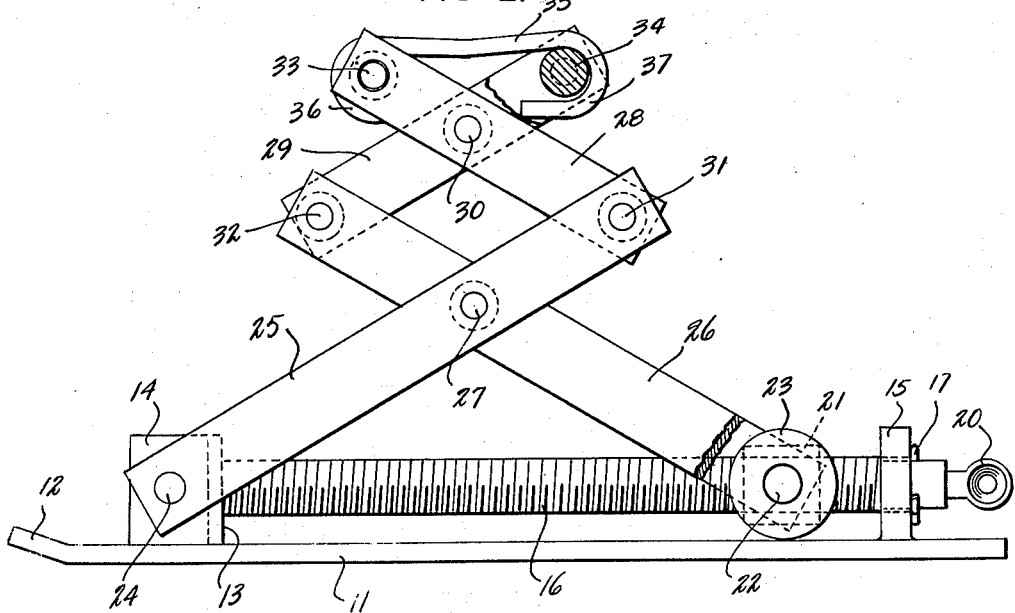
Figure 2 is a side elevational view, partly in cross-section, of the jack of Figure 1.

When shaft 16 is rotated, nut member 21 travels forwardly toward abutment member 13 and extends the linkage upwardly. Since the lower ends of links 25, 25 pivot around the stationary lugs 24, 24, pin 31 moves upwardly and arcuately in a counter-clockwise sense, as viewed in Figure 2. The upward movement of pin 32 is similar except that it moves arcuately in a counterclockwise sense. However, pin 27 and bearing plate 35 move forwardly toward abutment member 13 one half the forward distance travelled by nut member 21, providing a corresponding forward shifting of the vertical thrust of the jack.

When the chassis portion of the vehicle adjacent the deflated tire is raised, said chassis portion moves a short distance toward the opposite wheel of the vehicle due to the restoration of said opposite wheel from an inclined position to a vertical position. By suitably selecting the pitch of the threads on shaft 16, the movement of bearing plate 35 is made to substantially follow the movement of that portion of the vehicle adjacent the deflated tire engaged thereby as the vehicle is being jacked up preparatory to changing tires. Differential movement between bearing plate 35 and the chassis portion it engages is thus substantially prevented, whereby no sliding therebetween can occur during the jacking operation.

While a specific embodiment of a jack device for lifting automobiles has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. In a vehicle jack, a horizontally-disposed base, an abutment member secured to said base adjacent an end of the latter, a lug member arranged adjacent the other end of said base and secured to the latter, a horizontally-disposed threaded shaft extending through said lug and abutment members and rotatably mounted therein, a traveling nut member interposed between said abutment member and lug member and in threaded engagement with said shaft, and a scissors linkage operatively connected to said abutment member and said traveling nut member, said linkage embodying a first pair of bottom links, a second pair of bottom links, the first and second pairs of links being arranged in criss-cross relation with respect to each other, means extending through said pairs of links at the point at which the links criss-cross each other for pivotally connecting the same together, the lower ends of the first and second pairs of links being respectively pivotally connected to said abutment member and said traveling nut member, a third pair of links having the lower ends pivotally connected to the upper ends of said second pair of links, a fourth pair of links having their lower ends pivotally connected to the upper ends of said first pair of links, said third and fourth pairs of links being arranged in criss-cross relation with respect to each other and pivotally connected together at the point at which said links criss-cross each other, a connecting pin extending between the upper ends of each of said third and fourth pairs of links and supported therein, and a bearing plate extending between the connecting pins and secured to the latter for supporting a portion of a vehicle adjacent a deflated tire, the respective links of said first and second pairs of links being of equal lengths and longer than the respective links of said third and fourth pairs of links.

2. In a vehicle jack, a horizontally disposed base, an abutment member secured to said base adjacent an end of the latter, a lug member arranged adjacent the other end of said base and secured to the latter, a horizontally disposed threaded shaft extending through said lug and abutment members and rotatably mounted therein, a traveling nut member interposed between said abutment member and lug member and in threaded engagement with said shaft, and a scissors linkage operatively connected to said abutment member and said traveling nut member, said linkage embodying a first pair of bottom links, a second pair of bottom links arranged in criss cross relation with respect to said first named pair of links so that the criss cross point is closer to the upper ends of said pairs of links, means extending through said pairs of links at said criss cross point for pivotally connecting the same together, the lower ends of the first and second pairs of links being respectively pivotally connected to said abutment member and said traveling nut member, a third pair of links having the lower ends thereof pivotally connected to the upper ends of said second pair of links, a fourth pair of links having their lower ends pivotally connected to the upper ends of said first pair of links, said third and fourth pairs of links being arranged in criss cross relation with respect to each other so that the criss cross point is closer to the upper end thereof, means pivotally connecting said third and fourth pairs of links together at said criss cross point, connecting pins extending between the upper ends of each of said third and fourth pairs of links and supported therein, and a bearing plate extending between the connecting pins and secured to the latter for supporting a portion of a vehicle adjacent a deflated tire, the respective links of said first and second pairs of links being of equal length and longer than the respective links of said third and fourth pairs of links.

WINFIELD G. ERNST.
ROBERT M. NEWLIN.

REFERENCES CITED

The following references are of record in the file of this patent:

UNITED STATES PATENTS

| Number | Name | Date |
| --- | --- | --- |
| 1,138,715 | Young | May 11, 1915 |
| 1,954,558 | Conrad | Apr. 10, 1934 |
| 2,132,343 | Jarrett | Oct. 4, 1938 |

FOREIGN PATENTS

| Number | Country | Date |
| --- | --- | --- |
| 153,904 | Switzerland | July 1, 1932 |